United States Patent
Struffert et al.

(10) Patent No.: US 8,962,060 B2
(45) Date of Patent: Feb. 24, 2015

(54) PROCESS FOR PREPARING STABLE OIL IN WATER EMULSION WITHOUT ADDITIVES

(76) Inventors: Ulrich Struffert, Bad Iburg (DE); Pawel Lewandowski, Kruszwica (PL); Pierre Verdellet, Stiges (ES)

( * ) Notice: Subject to any disclaimer, the term of this patent is extended or adjusted under 35 U.S.C. 154(b) by 36 days.

(21) Appl. No.: 13/983,699

(22) PCT Filed: Feb. 3, 2012

(86) PCT No.: PCT/EP2012/051812
§ 371 (c)(1),
(2), (4) Date: Oct. 2, 2013

(87) PCT Pub. No.: WO2012/104398
PCT Pub. Date: Aug. 9, 2012

(65) Prior Publication Data
US 2014/0017388 A1    Jan. 16, 2014

(30) Foreign Application Priority Data
Feb. 3, 2011 (EP) .................................. 11153166

(51) Int. Cl.
*A23L 1/24* (2006.01)
*A23L 1/308* (2006.01)
*A23D 7/005* (2006.01)
*A23L 1/48* (2006.01)

(52) U.S. Cl.
CPC ................. *A23L 1/24* (2013.01); *A23D 7/0053* (2013.01); *A23L 1/3081* (2013.01); *A23L 1/483* (2013.01)
USPC ........................................................ 426/605

(58) Field of Classification Search
None
See application file for complete search history.

(56) References Cited

U.S. PATENT DOCUMENTS

| | | | |
|---|---|---|---|
| 7,914,383 B2 * | 3/2011 | Vignal | 464/180 |
| 2007/0128325 A1 * | 6/2007 | Merolla et al. | 426/589 |
| 2009/0148585 A1 * | 6/2009 | Bialek et al. | 426/605 |

* cited by examiner

*Primary Examiner* — Carolyn Paden
(74) *Attorney, Agent, or Firm* — Porzio, Bromberg & Newman, P.C.

(57) ABSTRACT

A process for preparing stabilized edible oil-in-water emulsion containing insoluble natural fiber and being free of food additives comprising the following steps: a) preparing a fiber phase; b) preparing an emulsion; and c) mixing the prepared fiber phase and emulsion.

10 Claims, 2 Drawing Sheets

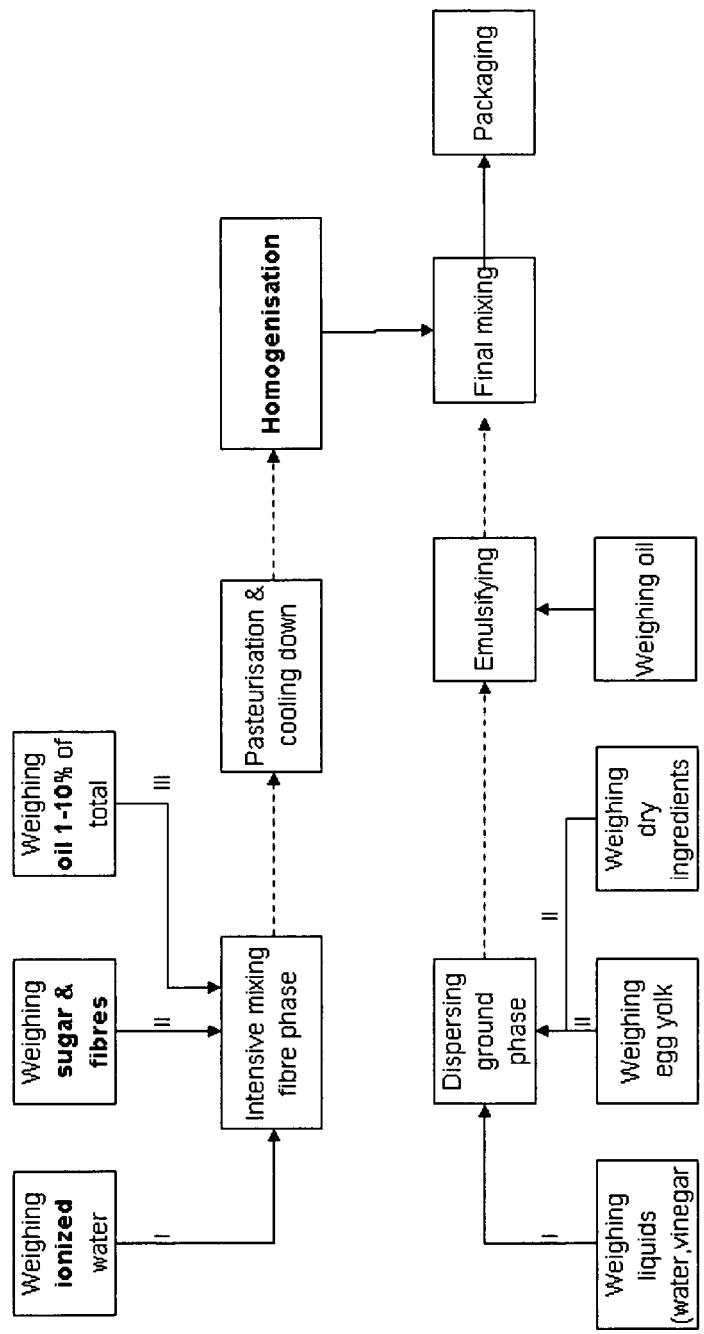
*Fig. 1: batch process for preparing stable edible oil-in-water emulsion*

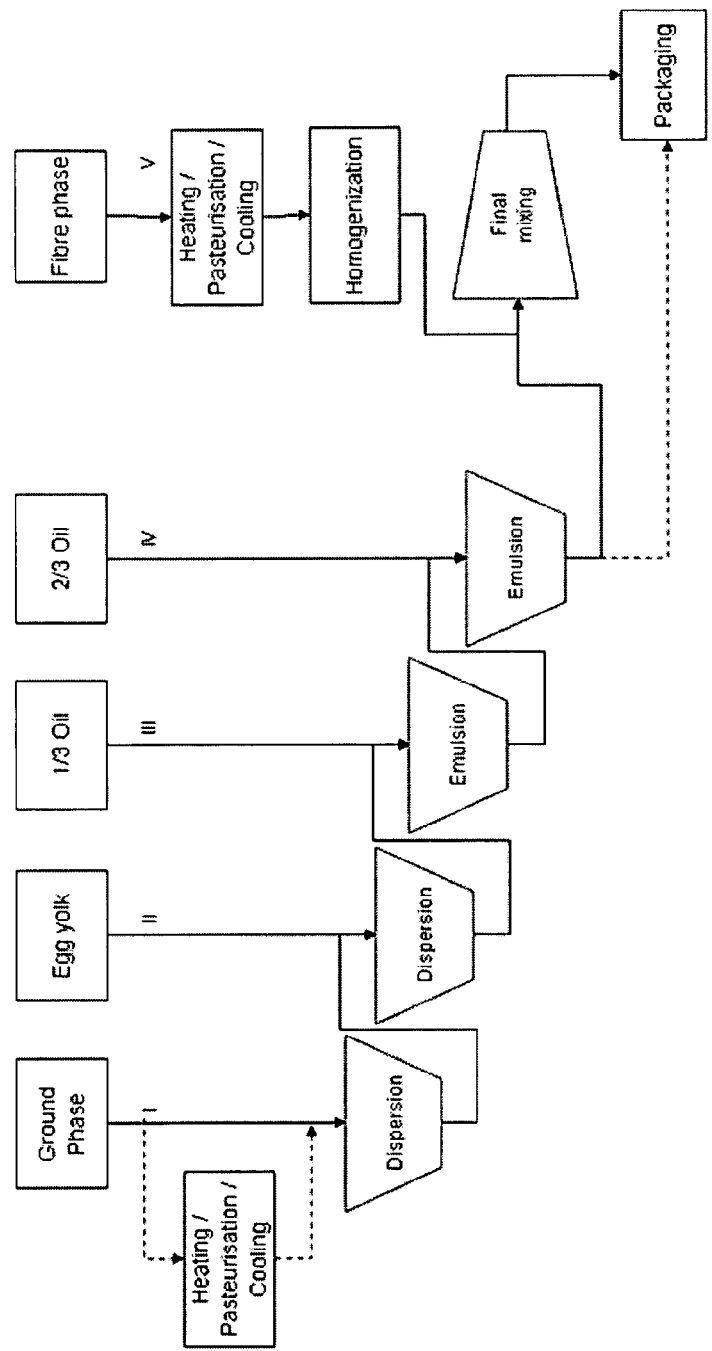
Fig. 2: semi batch / continuous process for preparing stable edible oil-in-water emulsion

PROCESS FOR PREPARING STABLE OIL IN WATER EMULSION WITHOUT ADDITIVES

BACKGROUND OF THE INVENTION

The present invention relates to a new process for preparing stabilised edible oil-in-water emulsion, especially mayonnaise or dressing, without using food additives.

An emulsion is a mixture of two (or more) immiscible liquids: a dispersed phase which is dispersed in a continuous phase. The boundary between these phases is called the interface. An oil-in-water (o/w) emulsion designates an emulsion in which oil is dispersed in water.

Main problem encountered with emulsions is their instability. Emulsions do indeed not form spontaneously. Energy input through shaking, stirring, homogenizing, or spray processes are needed to initially form an emulsion. Over time, emulsions tend to revert to the stable state of the phases comprising the emulsion. Such instability may be due to various factors among which improper process control, bad choice of emulsifier or wrong quantity of it, environmental influences during the production, stockpiling or use during the shelf life recommendation.

An example of this instability can be seen in the separation of the oil and vinegar components of vinaigrette, an unstable emulsion that will quickly separate unless shaken continuously.

Difference should be made between physical, microbiological and chemical stability. Physical stability of an emulsion indicates its resistance to changes in the dispersed state. An emulsion is said to be "physically stable" when its size distribution is independent from the time and place. This means that the droplets of the emulsion should not be subject to sedimentation, aggregation or coalescence. In principle, the following mechanisms may lead to the physical instability of an emulsion.

Sedimentation/Creaming

There is usually a difference of density between the continuous phase and the disperse phase of an emulsion which can lead to sedimentation or "creaming" of the droplets without impacting the droplet distribution of the disperse phase. Such process is reversible and the initial distribution of state can be restored, for example by shaking or gentle stirring.

Aggregation

The existence of attractive forces between the drops can lead to droplet aggregation (agglomeration, grapes etc ... ). The drops remain separate in the aggregates by a thin film of continuous phase which makes the droplet size distribution changing only in appearance. This process is reversible and the initial distribution of state can be restored, for example by shaking or gentle stirring.

Coalescence

An insufficient contact with droplets of the dispersed phase may stabilize the phase boundary to the tearing of the film located between the drops and lead to the confluence ("coalescence") of the drops. In the extreme case, this can lead to a complete phase separation of the system generally designated by "breaking" of the emulsion. Coalescence results in a "real" change of the droplets size distribution of the dispersed phase and is reversible only by a renewed comminution step/reduction of the size of droplets.

Ostwald Ripening

Differences in capillary pressures may grow larger droplets at the expense of smaller ones.

These physical processes can occur separately or together, one of the above processes being generally at the origin of another one, or strengthening it. For example, the formation of bunches or the coalescence generally increases the speed of sedimentation. Conversely, the sedimentation favours the aggregate coalescence.

Oil-in-water emulsions are commonly used in the food industry for preparing various food products (or foodstuffs) such as mayonnaise or emulsified sauce among which Hollandaise sauce, Béarnaise sauce or dressing. The most important characteristic of such edible oil-in-water emulsion is its stability. For example, an insufficient short-term stability will lead to the breaking of the emulsion and will significantly impact the quality (texture, mouthfeel etc ... ) of the product. It is therefore necessary to provide highly stable edible oil-in-water emulsions for preparing food products such as mayonnaise or emulsified sauce among which Hollandaise sauce, Béarnaise sauce or dressing.

The quality of an emulsion is generally characterised by the average oil droplets size and the distribution of said oil droplets. For example, for high fat mayonnaise, mean oil droplets diameter should be of from 6 to 12 μm.

Various food additives such as emulsifier and stabiliser or thickener are generally used improve the stability of edible oil-in-water emulsions.

Emulsifier is an ambiphilic surface-active substance possessing a hydrophilic and a lipophilic moiety. An emulsifier stabilizes an emulsion by increasing its kinetic stability. Various emulsifiers can be used for preparing edible oil-in-water emulsions among which lecithin, monoglycerides, diglycerides or proteins.

Stabiliser (or thickener) is a macro-molecule increasing the viscosity of the continuous phase which reduces the mobility of the plug and slows the sedimentation or creaming. Various stabilisers can be used for preparing edible oil-in-water emulsions among which starch, pectin, gelatine, xanthan gum, guar gum or local bean gum.

To regulate these food additives, and to inform consumers, each of these additives is assigned a unique number, termed as "E-number". An "E-number" designates a code for food additive that has been assessed for use within the European Union (the "E" prefix stands for "Europe"). They are commonly found on food labels throughout the European Union. Safety assessment and approval are the responsibility of the European Food Safety Authority.

Nevertheless, several drawbacks are associated to the use of such "E-number" additives for preparing stable edible oil-in water emulsions.

First, it is commonly known that, in the mind of consumers (and in casual language in the UK), "E-number" is perceived as a pejorative term designating artificial, chemical and/or non-natural food additives In addition, the use of such E-number additives for stabilising edible oil-in-water emulsions can impact significantly the quality of the food product (such as mayonnaise or dressing which can be too sticky, can have a bad mouthfeel (characterized by various criteria used in sensory profiles such as melting behaviour, flowing, film, dense, sticky or raw) and/or can become off-flavoured after pasteurisation.

Subsequently, the use of such E-number additives has an impact on the price of the food product since their production is generally expensive.

Finally, the use of E-number food additives may have a mid- or long-term impact on the health of the consumers.

Accordingly, there exists a strong need for providing food products such as mayonnaise or dressing that are "free of E-number additives" while maintaining their quality.

International patent application WO-A-2005/039316 discloses edible emulsion containing insoluble natural fibres and a process for making the same. The insoluble natural fibres are used for preparing reduced-fat products without decreasing their taste and mouthfeel in comparison to full-fat products. Nevertheless, the process disclosed in this application for preparing said emulsions does not allow preparing a stable emulsion free of food additives.

SUMMARY OF THE INVENTION

It has now been found a process which allows preparing a stabilised edible oil-in-water emulsion containing insoluble natural fibre and being free of food additives, while maintaining its quality.

Accordingly, the present invention relates to a process for preparing stabilised edible oil-in-water emulsion containing insoluble natural fibre and being free of food additives comprising the following steps:

a) 1. preparing a fibre phase by introducing:
   from 75% to 99% of ionised water and/or demineralised water;
   from 0.1% to 20% of vegetable oil;
   from 0.01% to 10% of insoluble natural fibre; and
   from 0% to 10% of sugar;
   in a reactor under vacuum at a pressure of from 0.01 bar to 1 bar and under stirring;
   2. pasteurising said fibre phase; and
   3. homogenising said fibre phase;
b) preparing an edible oil-in-water emulsion containing:
   water;
   vinegar;
   egg yolk;
   dry ingredients chosen among salt, sugar, egg powder, condiment, spice and/or aromatic herb; and
   vegetable oil;
c) mixing the prepared fibre phase and edible oil-in-water emulsion.

DESCRIPTION OF THE FIGURES

FIG. 1 shows the batch process for preparing stable oil in water emulsions.

FIG. 2 shows a semi-batch/continuous process for preparing stable edible oil in water emulsions.

DETAILED DESCRIPTION OF THE INVENTION

In the context of the present invention:

"food additive" means any substance not normally consumed as a food by itself and having a E-number, added intentionally to a foodstuff to modify its chemical, physical or organoleptic characteristics;

"free of food additives" means that food additives are not intentionally added to the food product;

"edible oil-in-water emulsion" designates any edible emulsion comprising of from 0.3% to 82% of oil and of from 5% to 75% of water "insoluble natural fibres" designates fibres that can be found in fruits, both citrus and non-citrus, vegetables among which legumes and grains; or fibres which are plant-derived, root-derived or wood-derived. Preferably, insoluble natural fibres according to the present invention are recovered from tomatoes, peaches, pears, apples, plums, lemons, limes, oranges, grapefruits or mixtures thereof. More preferably, insoluble natural fibres designate fibres which are commercially available from suppliers like J. Rettenmaier and Sohne GMBH under the Vitacel name and Herbstreith & Fox under the Herbacel name, among which Herbacel AQ Plus Citrus which is cell-wall material produced from harvest-fresh de-juiced and de-oiled citrus fruits;

"vegetable oil" means any edible oil extracted from plants among which palm oil, soybean oil, rapeseed oil, sunflower seed oil, peanut oil, cottonseed oil, palm kernel oil, coconut oil, olive oil, corn oil, grape seed oil, hazelnut oil, linseed oil, rice bran oil, safflower oil or sesame oil. Preferably, "vegetable oil" designates soybean oil, rapeseed oil, sunflower seed oil or olive oil;

unless otherwise specified all % values are weight %.

The process according to the present invention allows preparing a stabilised oil-in-water emulsion free of food additives while maintaining its quality.

The present invention relates to a process for preparing stabilised edible oil-in-water emulsion containing insoluble natural fibre and being free of food additives by mixing a fibre phase and an emulsion.

Fibre phase is prepared by mixing specific ingredients under vacuum and stirring (step a) of the above process). Preferably, the fibre phase is prepared under the following conditions, taken individually or in combination:

from 80% to 98%, more preferably from 85% to 98% of ionised water and/or demineralised water is introduced in the reactor;

from 0.5% to 15%, more preferably from 0.5% to 10% of vegetable oil is introduced in the reactor;

from 0.05% to 7%, more preferably from 0.1% to 5% of insoluble natural fibre is introduced in the reactor;

from 0% to 7%, more preferably from 0% to 5% of sugar is introduced in the reactor;

the pressure under which the mixture is stirred is of from 0.05 bar to 0.7 bar, preferably of from 0.1 bar to 0.5 bar;

the mixture is stirred at a speed of from 1000 to 10.000 rpm, more preferably of from 2000 to 7000 rpm;

the mixture is stirred during 1 to 30 minutes, more preferably during 5 to 15 minutes;

the mixture is stirred under a temperature of from 10° C. to 100° C., preferably of from 15° C. to 90° C.

For preparing the fibre phase, stirring can be made using any suitable equipment and apparatus known to the skilled artisan. Preferably, stirring is made using a mixing paddle or an agitator with high shear rate or good mixing properties for increasing viscosity.

Pasteurisation of the fibre phase can be made using any process known to the skilled artisan.

Homogenisation of the fibre phase can be made using any process known to the skilled artisan. Preferably, homogenisation is made in a high pressure homogenizer.

Step b) of the process according to the invention allows preparing an edible oil-in-water emulsion containing water, vinegar, egg yolk, dry ingredients and vegetable oils. Preferably, the emulsion prepared according to step b) of the process according to the present invention contains:

from 5% to 75% of water;
from 2% to 8% of vinegar;
from 0.3% to 8% of egg yolk;
from 0.1% to 8% of dry ingredients;
from 0.3% to 82% of vegetable oil; and
from 0% to 10% of mustard, preferably from 0% to 3% of mustard;

For preparing the edible oil-in-water emulsion as defined above, any classical method, equipment, apparatus and experimental conditions known to the skilled artisan may be used.

Stabilised edible oil-in-water emulsion free of food additives is prepared by mixing the above defined fibre phase with the above defined edible oil-in-water emulsion (step c) of the above process). Preferably, the stabilised edible oil-in-water emulsion is prepared by mixing from 5% to 65% of the above defined fibre phase and from 35% to 95% of the above defined edible oil-in-water emulsion.

For mixing above defined the fibre phase with the above defined edible oil-in-water emulsion and thus preparing the stabilised edible oil-in-water emulsion being free of food additives, any classical method, equipment and experimental conditions known to the skilled artisan may be used.

The process according to the present invention comprises the steps of preparing a fibre phase (step a)), preparing an emulsion (step b)), and mixing both phases (step c)). Since the fibre phase and the emulsion are prepared separately, it is clear that steps a) and b) of the process according to the present invention can be conducted simultaneously or successively. In the situation where steps a) and b) are conducted successively, step a) can indifferently be conducted before or after step b).

The process according to the present invention can be conducted using any suitable production plan. FIGS. 1 and 2 illustrate examples of production plans which can be used to put the process according to the present invention into practice.

The process according to the present invention can be used for preparing any edible oil-in-water emulsion. The process according to the present invention is particularly suitable for preparing food products such as mayonnaise or dressing.

The present invention will now be illustrated in a non-limited manner by the following examples.

EXAMPLE 1

Preparation of a Fibre Phase

A fibre phase is prepared by adding the following ingredients into a UMC 12:

| Order (rank) of addition | Ingredient | Quantity (in %) |
|---|---|---|
| 1 | Water | 94 |
| 2 | Sunflower oil | 1 |
| 3 | Sugar | 2.5 |
| 4 | Herbacel AQ Plus Citrus | 2.5 |

These ingredients are then stirred at 3000 rpm, under 500 mBar, at room temperature, during 5 minutes.

The obtained mixture is then pasteurised at 85° C. under stirring at 3000 rpm, under 500 mBar, during 3 minutes.

The pasteurised mixture is then cooled down until room temperature under stirring at 300 to 500 rpm.

The obtained mixture is then homogenised in a high pressure homogeniser having 2 stages, the first being under 100 Bars, the second being under 40 Bars.

EXAMPLE 2

Preparation of a Stabilised Edible Oil-in-Water Emulsion Containing 30% of Oil (Stabilised Emulsion n°1)

The following ingredients are added into a UMC 12 to prepare a water phase:

| Order (rank) of addition | Ingredient | Quantity (in %) |
|---|---|---|
| 1 | Water | 34.7 |
| 2 | Vinegar | 17.4 |
| 3 | Flavours | 2.1 |
| 4 | Sugar | 18.1 |
| 5 | Salt | 6.9 |
| 6 | Egg powder | 20.8 |

These ingredients are dispersed at 3000 rpm, under 500 mBar, at 15° C. to 20° C., during 1 to 3 minutes.

Oil is emulsified to the above prepared water phase at 3000 rpm, under 500 mBar, at 15° C. to 20° C., during 2 to 3 minutes.

The fibre phase as prepared in the example 1 is then added to the emulsion under stirring at 2500 rpm, under 500 mBar, at 15° C. to 20° C., during 1 minute.

The final composition of the obtained stabilised emulsion is as follows:

| Stabilised emulsion n°1 | |
|---|---|
| Water phase | 14.4% |
| Oil | 29.4% |
| Fibre phase of example 1 | 56.2% |

EXAMPLE 3

Preparation of a Stabilised Edible Oil-in-Water Emulsion Containing 50% of Oil (Stabilised Emulsion n°2)

The following ingredients are added into a UMC 12 to prepare a water phase:

| Order (rank) of addition | Ingredient | Quantity (in %) |
|---|---|---|
| 1 | Water | 49.6 |
| 2 | Vinegar | 12.8 |
| 3 | Flavours | 3.5 |
| 4 | Sugar | 13.5 |
| 5 | Salt | 7.1 |
| 6 | Egg powder | 13.5 |

These ingredients are dispersed at 3000 rpm, under 500 mBar, at 15° C. to 20° C., during 1 to 3 minutes.

Oil is emulsified to the above prepared water phase at 2750 rpm, under 500 mBar, at 15° C. to 20° C., during 2 to 3 minutes.

The fibre phase as prepared in the example 1 is then added to the emulsion under stirring at 2500 rpm, under 500 mBar, at 15° C. to 20° C., during 1 minute.

The final composition of the obtained stabilised emulsion is as follows:

| Stabilised emulsion n°2 | |
|---|---|
| Water phase | 14.1% |
| Oil | 49.3% |
| Fibre phase of example 1 | 36.6% |

EXAMPLE 4

Preparation of a Stabilised Edible Oil-in-Water Emulsion Containing 67% of Oil (Stabilised Emulsion n°3)

The following ingredients are added into a UMC 12 to prepare a water phase:

| Order (rank) of addition | Ingredient | Quantity (in %) |
|---|---|---|
| 1 | Water | 69.6 |
| 2 | Vinegar | 4.4 |
| 3 | Flavours | 1.9 |
| 4 | Sugar | 10.9 |
| 5 | Salt | 3.9 |
| 6 | Egg powder | 9.3 |

These ingredients are dispersed at 3000 rpm, under 500 mBar, at 15° C. to 20° C., during 1 to 3 minutes.

Oil is emulsified to the above prepared water phase at 2250 rpm, under 500 mBar, at 15° C. to 20° C., during 2 to 3 minutes.

The fibre phase as prepared in the example 1 is then added to the emulsion under stirring, at 2500 rpm, under 500 mBar, at 15° C. to 20° C., during 1 minute.

The final composition of the obtained stabilised emulsion is as follows:

| Stabilised emulsion n°3 | |
|---|---|
| Water phase | 25.7% |
| Oil | 66.9% |
| Fibre phase of example 1 | 7.4% |

EXAMPLE 5

Stability Assessment

The above prepared stabilised emulsions n° 1 to 3 (examples 2 to 4) have been stored at different temperature during 64 days and the stability has been assessed according to QDA (Quantitative Descriptive Analysis—ISO standard 5492:2008 Sensory analysis Vocabulatory).

The results obtained are reported in the table below:

| Emulsion | Storage during 64 days at 6° C. | Storage during 64 days at 20° C. | Storage during 64 days at 30° C. |
|---|---|---|---|
| Stabilised emulsion n°1 | Stable | Stable | Stable |
| Stabilised emulsion n°2 | Stable | Stable | Stable |
| Stabilised emulsion n°3 | Stable | Stable | Stable |

The emulsions prepared according to examples 2 to 4 (stabilised emulsions n° 1 to 3) have evidenced good stability, whatever are the storage conditions/temperatures.

EXAMPLE 6

Mouthfeeling Assessment

The above prepared stabilised emulsions n° 1 to 3 have been stored at different temperature during 64 days and the mouthfeeling has been assessed by 10 trained persons (ISO 13299:2003 Sensory analysis, Methodology, General guidance for establishing a sensory profile) who have noted and checked the melting, the flowing, the film, the density, the starch and the raw of these emulsions respectively in comparison to the commercial product Oleina 30%, 50% and 67% (containing starch).

No significant differences have been reported.

The invention claimed is:
1. A process for preparing stable edible oil-in-water emulsion containing insoluble natural fibre and being free of food additives comprising the following steps:
   a) 1. preparing a fibre phase by introducing:
      from 75% to 99% of ionised water and/or demineralised water;
      from 0.1% to 20% of vegetable oil;
      from 0.01% to 10% of insoluble natural fibre; and
      from 0% to 10% of sugar;
   in a reactor under vacuum at a pressure of from 0.01 bar to 1 bar and under stirring;
      2. pasteurising said fibre phase; and
      3. homogenising said fibre phase;
   b) preparing an edible oil-in-water emulsion containing:
      water;
      vinegar;
      egg yolk;
      dry ingredients chosen among salt, sugar, egg powder, condiment, spice and/or aromatic herb; and
      vegetable oil;
   c) mixing the prepared fibre phase and edible oil-in-water emulsion.
2. A process according to claim 1, characterised in that 0.05% to 7% of insoluble natural fibre is introduced in the reactor.
3. A process according to claim 1, characterised in that the pressure in the reactor used for preparing the fibre phase is of from 0.05 bar to 0.7 bar.
4. A process according to claim 1 characterised in that the fibre phase is stirred in the reactor under a temperature of from 10° C. to 100° C.
5. A process according to claim 1 characterised in that the edible water-in-oil prepared according to step b) contains:
   from 5% to 75% of water;
   from 2% to 8% of vinegar;
   from 0.3% to 8% of egg yolk;
   from 0.1% to 8% of dry ingredients;
   from 0.3% to 82% of vegetable oil; and
   from 0% to 10% of mustard.
6. A process according to claim 1 characterised in that the stabilised edible oil-in-water emulsion is prepared by mixing:
   from 5% to 65% of the fibre phase; and
   from 35% to 95% of the edible oil-in-water emulsion.
7. A process according to claim 1 characterised in that steps a) and b) are conducted simultaneously.
8. A process according to claim 1 characterised in that steps a) and b) are conducted successively, step a) being conducted before step b).
9. A process according to claim 1 characterised in that steps a) and b) are conducted successively, step b) being conducted before step a).
10. A process according to claim 1 for preparing mayonnaise or dressing.

* * * * *